UNITED STATES PATENT OFFICE.

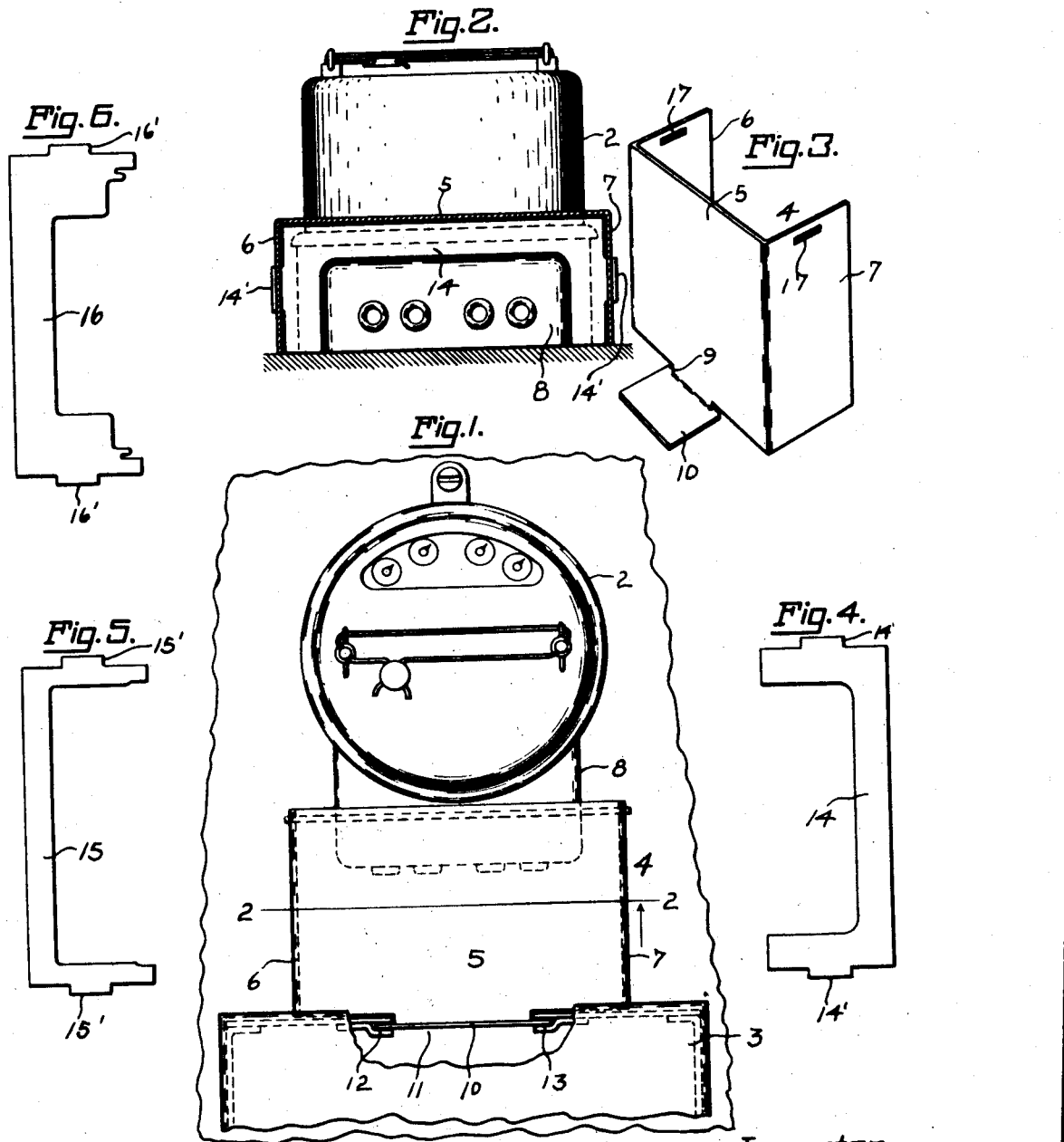

JOSEPH SACHS, OF HARTFORD, CONNECTICUT.

METER-ADAPTER.

1,194,880.

Specification of Letters Patent. Patented Aug. 15, 1916.

Application filed July 27, 1915. Serial No. 42,217.

*To all whom it may concern:*

Be it known that I, JOSEPH SACHS, a citizen of the United States, residing at Hartford, in the county of Hartford and State of Connecticut, have invented certain new and useful Improvements in Meter-Adapters, of which the following is a specification.

This invention relates to meter-adapters.

In certain meter-installations it is not uncommon to employ in conjunction with the meter what is known as an "adapter." As is well-known meters vary in size and shape, and one of the fundamental purposes of the invention is to provide a meter-adapter having means by which it can be made to properly conform to and function with these various kinds of meters. The object in question can be attained in various ways, although I prefer to provide what I term an "adapter body" provided with means for the interlocking or other suitable connection therewith of what I denote as a "closure member." This closure member which is an element distinct or separate from the body, will be such as to properly adapt it to the particular meter in conjunction with which the adapter is to be employed.

In the drawings accompanying and forming part of the present specification I have represented in detail one of the several convenient forms of embodiment of the invention which will be set forth in detail in the following description. I do not restrict myself to this particular disclosure; I may depart therefrom in several respects within the scope of the invention defined by the claims following said description.

Referring to said drawings: Figure 1 is a front elevation of a meter-installation, a part of the box being removed and broken away in which is incorporated an adapter embodying the invention. Fig. 2 is a transverse section on the line 2—2 of Fig. 1. Fig. 3 is a perspective view of the adapter body shown in Figs. 1 and 2. Figs. 4, 5 and 6 are detail views of different kinds of closure members.

Like characters refer to like parts throughout the several views, which it will be noted are on different scales.

In certain meter installations as shown for example in Fig. 1 there is associated with a meter as 2, a box as 3. This box may contain one or more electric appliances, for example, an electric switch. The wires from the switch incased in the box 3 extend to the meter, and it is the purpose of the adapter to house or inclose these wires and to also prevent tampering with the meter at the points at which such wires are connected therewith. The adapter is preferably interposed between a box as 3 and a meter as 2. As will be obvious, I do not restrict myself to the employment of the adapter in conjunction with any particular kind of box or meter. On the contrary in fact my primary object is to provide a universally usable adapter in that it is of such nature as to provide for its proper connection with a meter and as may be inferred the meter 2 is merely one of many different kinds with which the adapter can properly coöperate. The adapter is preferably of such character as to receive within it a part only of the meter. As will hereinafter appear what is known as the meter-connection box of the meter projects into the adapter. There may be instances where the adapter will wholly receive this connection box, and in such event the adapter will receive within it the body of the meter or enough of the meter to insure that the indicator can be properly read at any time.

The adapter body as may be inferred, may be of any suitable shape. That shown is denoted in a general way by 4 comprising the front 5 and the parallel sides 6 and 7, said adapter body being usually made of sheet metal in one piece. The body shown is approximately rectangular in cross section, although as will be gathered, this is not an essential matter, the invention not concerning the shape or the size of the body. Ordinarily, however, I would make it of a dimension to receive the largest size meter in the manner already noted. As will be obvious the top and bottom or ends of the adapter body 4 are open to thus provide a duct for the wires from the box 3 or its equivalent to the meter. The adapter body therefore, wholly incloses the wires in question and also incloses that part of the meter which should be protected, which part in the present case is the connection-box 8. In the present showing this terminal chamber or connection box 8 extends into the upper open end of the adapter body 4, the latter being provided with suitable means by which it can be removably interlocked with the box 3 or analogous part. As shown the front 5 of the adapter body is provided with a downwardly extending lip 9 in the plane of said front and from this lip the flange or wing 10 extends outwardly and also laterally from the said lip 9. In what is shown as the top of the box 3 is a wire opening 11 at opposite sides of which are disposed the parallel guides or slideways 12 and 13 into which the lateral portions of the flange 10 are slidable, there being as will be evident a space between the flange 10 and the lower edge of the front 5 in which the top of the box 3 can be received to thus provide if necessary, the direct superimposing of the body 4 upon the top of the box 3 and thereby provide for the association of the two elements. When so associated the adapter is sealed and locked in position by the cover of the box 3 when said cover is sealed in position as is usual.

In Figs. 4, 5 and 6 I show three of many different forms of closure members interchangeably usable with the adapter body 4, the same being denoted in a general way by 14, 15 and 16 respectively. Each of the closure members as represented is in the form approximately of a flat plate of practically yoke form, the yoke-like closure element which for the time being is to be used in conjunction with the adapter body 4 being adapted to preferably closely straddle the meter. In view of this fact the interior of the closure members 14, 15 and 16 or of other type is made to conform to the transverse shape of that part of the meter which the closure member is adapted to embrace or hug. Figs. 4, 5 and 6 indicate the fact that the openings or interiors of the three adapters are of different shapes. There will be as obvious many other forms. The adapters shown are adapted to straddle the connection box of the meter and in the showing the adapter 14 is of a form to receive closely within it the box 8. The adapters 15 and 16 receive other shapes of boxes. Where the adapter is to fit the meter body the opening in it would be different from those in the closure members 14, 15 and 16.

The closure members of whatever nature they may be are preferably resilient or bendable, and this condition I obtain best by making them of sheet metal by which the requisite quality is insured. The legs or side portions of the several closure members 14, 15 and 16 are preferably provided with suitable means for removable interlocking connection with the sides 6 and 7 of the adapter body 4. As shown the legs or branches of the closure members are provided with outwardly extending lugs 14', 15' and 16' respectively, the lugs of each pair being in alinement longitudinally of the respective closure members. The sides 6 and 7 of the adapter body have elongated slots 17 opposite each other which present keyways to receive the lugs or keys of the respective closure members or plates. The closure member 14 is of a shape to fit the specific meter 2 represented, the opening in said closure member 14, therefore, being of a form to closely receive the connection box 8. It will be assumed that it is desired to make an installation, that the meter 2 and box 3 are mounted and the wires connected up but that the adapter 4 and the appropriate closure member are not positioned. In this event the closure member to be used, 14 in the present instance, will be slightly bent or flexed and introduced in the upper open end of the adapter body 4 until the lugs 14' are opposite the slots 17 at which point the closure member 14 will be bent back so that the lugs 14' can be projected into the slots 17 and the outer flat or straight sides of the legs of the closure member will be brought into solid substantial engagement with the flat inner faces of the sides 6 and 7, the outer edge of the transverse portion of the closure member being at the same time solid against the inner surface of the front 5 so that the closure member is interlocked and solid with the adapter body 4. The ends of the lugs 14', after being projected through the slots 17, may be bent or headed over. After the closure member is connected with the adapter body, the adapter body will be interlocked with the box 3 and the closure member 14 caused to straddle the meter embracing the box 8 in the organization illustrated. Should the meter be of a different form it might be necessary to connect either of the closure members 15 or 16 with the adapter body 4, while it is likely that one of a radically different form may have to be connected with the adapter body. The closure member may also be sealed to the adapter body by any well-known sealing means and the adapter may also be held in position in its relation to the meter and other coacting parts or devices by other well-known means.

The adapter when in operative condition comprises a body and a closure member. I have mentioned the fact that the closure member is distinct or separate from the body. By this I mean that there are two distinct or individual elements. From what has been noted the body is susceptible of use in connection with any one of several closure members, the particular closure member which is to be associated with the body depending upon the character (that is either type or size) of meter which is to be received in the body. The closure member when in working relation, as its name implies, closes one end of the channel-like body to prevent access thereto at this particular end.

What I claim is:

1. A meter adapter body of a form to receive within it terminal chambers of different characters of meters, said body being provided with means for its connection with an electric appliance receiving cabinet and being also provided with means for the connection therewith of a closure member to conform to the terminal chamber of the meter, extending into said body.

2. A meter adapter comprising a body open at the ends, said meter adapter having means for connecting one open end thereof with an electric appliance receiving cabinet and a closure member distinct from and connected with the body at the other open end thereof, said closure member being shaped to fit the meter and said meter and closure member jointly closing the end of the body opposite that connected to the cabinet.

3. A meter adapter comprising a body to receive the terminal chamber of an electric meter and a closure member distinct from the body and fitted thereto, said closure member having an opening to conform to the terminal chamber of the particular meter associated with said body.

4. A meter adapter comprising a body and a closure member fitted in and interlocked to the body, the closure member having an opening to receive an electric meter and being bendable to position the same for interlocking relation with said body.

5. A meter adapter comprising a body to receive a meter, and a closure member to straddle the meter, said closure member being distinct from and abutting edgewise against the body.

6. A meter adapter comprising a body to receive an electric meter, said body having a front and sides, the sides having elongated slots, and a resilient closure member in the body abutting against the front and the sides and having lugs to enter said slots and also having an opening in which the meter is adapted to be fitted.

7. A meter adapter comprising a body to receive an electric meter, and a closure member for the body connected therewith and shaped to straddle and conform edgewise to the meter, said body having means for interlocking connection with a box.

8. A meter adapter for use in conjunction with electric meters having means whereby it may be fitted to various kinds of meters and also having means for its interlocking connection with a box.

9. A meter adapter comprising a body to receive an electric meter, and a closure member for the body, connected therewith, the body having a flange projecting therefrom to interlock with a seat on a separate member.

10. A meter adapter element comprising a body having a front and sides and open top and bottom, the front having a depending lip provided with an outwardly extending flange projecting laterally from the lip.

11. A meter adapter element comprising a body having a front and sides and open top and bottom, the front having a depending lip provided with an outwardly extending flange projecting laterally from the lip, and said sides having elongated slots.

12. A meter adapter comprising a body having a front and sides and open top and bottom and of a form to receive different characters of meters, and a closure member for said body, said body having means for the connection therewith of said closure member.

13. A meter adapter comprising two distinct elements, one consisting of a body and the other consisting of a closure member, provided respectively with means for their connection with each other, the body member being formed to receive meters of various characters and the closure member being in the form of a yoke to straddle the meter.

14. A meter adapter comprising a substantially channel-shaped body, means associated with said body for connecting it with a coöperating independent element against which one end of the channel-shaped body abuts, and a closure member for the other end of said channel-shaped body, said closure member being provided with means for its removable connection to said body member and shaped to conform edgewise with that portion of the meter projecting into the body portion.

15. The combination of a box, an adapter body fitting against the box, a removable closure member for the adapter body, and a meter external of the adapter body and provided with a terminal chamber extending by way of said closure member into said adapter body.

16. A meter adapter of substantially channel form associable at one end with a box and at the other end being provided with removable means shaped to conform edgewise with that part of the meter projecting into the body.

In testimony whereof I affix my signature in presence of two witnesses.

JOSEPH SACHS.

Witnesses:
L. L. MARKEL,
HEATH SUTHERLAND.